(12) United States Patent
Kim

(10) Patent No.: US 7,717,384 B2
(45) Date of Patent: May 18, 2010

(54) STAND OF DISPLAY DEVICE

(75) Inventor: Chang Sub Kim, Gyeongsangbook-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/483,342

(22) Filed: Jul. 11, 2006

(65) Prior Publication Data

US 2007/0193092 A1    Aug. 23, 2007

(30) Foreign Application Priority Data

Feb. 17, 2006   (KR) ...................... 10-2006-0015876

(51) Int. Cl.
*F16M 5/00* (2006.01)

(52) U.S. Cl. .................... 248/284.1; 248/920; 248/921; 248/296.1

(58) Field of Classification Search ............. 248/125.7, 248/370, 371, 297, 917–924, 284.1, 296.1
See application file for complete search history.

(56) References Cited

U.S. PATENT DOCUMENTS

| | | | |
|---|---|---|---|
| 5,812,368 A * | 9/1998 | Chen et al. ................... 361/681 |
| 6,288,891 B1 * | 9/2001 | Hasegawa et al. ........... 361/681 |
| 6,712,321 B1 | 3/2004 | Su et al. |
| 6,766,994 B2 * | 7/2004 | Serbinski et al. ............ 248/371 |
| 6,788,530 B2 * | 9/2004 | Hill et al. ..................... 361/683 |
| 6,975,507 B2 * | 12/2005 | Wang et al. .................. 361/683 |
| 7,036,787 B1 * | 5/2006 | Lin ............................. 248/676 |
| 7,059,576 B2 * | 6/2006 | Chen et al. ................... 248/371 |
| 7,061,753 B2 * | 6/2006 | Michoux et al. ............ 361/681 |
| 7,124,984 B2 * | 10/2006 | Yokouchi et al. ......... 248/125.8 |
| 2005/0247832 A1 | 11/2005 | Cho et al. |
| 2005/0254204 A1 | 11/2005 | Hwang et al. |
| 2006/0118686 A1 | 6/2006 | Hsieh et al. |
| 2007/0145203 A1 | 6/2007 | Takada et al. |

FOREIGN PATENT DOCUMENTS

| | | |
|---|---|---|
| JP | 2004-333744 A | 11/2004 |
| TW | 246 668 B | 1/2006 |
| WO | WO-2004/079699 | 9/2004 |

\* cited by examiner

*Primary Examiner*—J. Allen Shriver, II
*Assistant Examiner*—Stevem M. Marsh
(74) *Attorney, Agent, or Firm*—Birch, Stewart, Kolasch & Birch, LLP (57) ABSTRACT

A stand of display device is provided. The stand of the display device includes a sliding part extending straight from the display device, a support part slidably support a lower portion of the sliding part, and a base rotatably supporting a lower portion of the support part. Accordingly, the height and inclination angle of the display device can be adjusted in various manners, and such facilitation in position adjustment of the display device improves user's convenience and makes a package volume of the display device small, thereby reducing a distribution cost and facilitating moving the device.

17 Claims, 11 Drawing Sheets

STAND OF DISPLAY DEVICE

BACKGROUND OF THE INVENTION

1. Field of the Invention

The present invention relates to a stand of a display device, and more particularly, to a stand of a display device capable of allowing a user to conveniently move the display device to various positions, and of reducing a package volume in packaging the display device and stand to thereby reduce a distribution cost.

2. Description of the Related Art

A representative example of a display device is a monitor, and the monitor can be used with its position variously moved by a user. In order to help users conveniently move such a display device, a related art stand of a quadric link structure has been proposed that offers convenient control over an angle of a display device. The stand of the display device employing the quadric link structure improves convenience of a user because an inclination angle of the display device is fixed while a position of the display device is adjusted.

However, in the related art stand of the display device employing the quadric link, a position of the display device is adjusted only by rotation about a lower side of the stand. Thus, the position adjustment of the display device is disadvantageously limited to rotation about a lower end of the stand.

Also, when the related art stand of the display device is packaged up, the volume thereof is increased. For this reason, a relatively small number of display devices can be loaded in a package having the same volume.

SUMMARY OF THE INVENTION

Accordingly, the present invention is directed to a stand of a display device that substantially obviates one or more problems due to limitations and disadvantages of the related art.

An object of the present invention is to provide an a stand of a display device capable of improving user's convenience by making a height and an inclination angle of the display device adjustable in various manners and thus facilitating position control of the display device.

Another object of the present invention is to provide a stand of a display device capable of reducing a distribution cost by allowing the display device to be packaged to a small volume.

A further another object of the present invention is to provide a stand of a display device capable of modifying and adjusting a position of the display device at a low cost in various manners.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand of a display device, including: a sliding part extending from a display device; a support part slidably supporting a lower portion of the sliding part; and a base rotatably supporting a lower portion of the support part.

In another aspect of the present invention, there is provided a stand of a display device, including: a rear fixing part fixed to a rear side of a display device; a sliding part extending downward from the rear fixing part; a support part slidably supporting a lower portion of the sliding part; a quadric link provided between the rear fixing part and the support part and adjusting an angle at which the display device is inclined; and a base rotatably supporting a lower portion of the support part.

In a further another aspect of the present invention, there is provided a stand of a display device, including: a rear fixing part fixed to a rear side of a display device; a sliding part extending downward from the rear fixing part; a support part supporting a lower end portion of the sliding part; and a base supporting a lower portion of the support part, wherein the sliding part is movable along a direction that the support part extends.

According to the stand of the display device, a user can adjust a position of the display device in various manners, and an inclination angle of the display device is not changed while the user adjusts the position of the display device, thereby improving user's convenience. Also, a package volume is remarkably reduced in packaging the display device, thereby reducing a distribution cost and reducing a manufacturing cost of the stand.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 9 through 13 are side views for explaining an operation mode of the stand, wherein

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
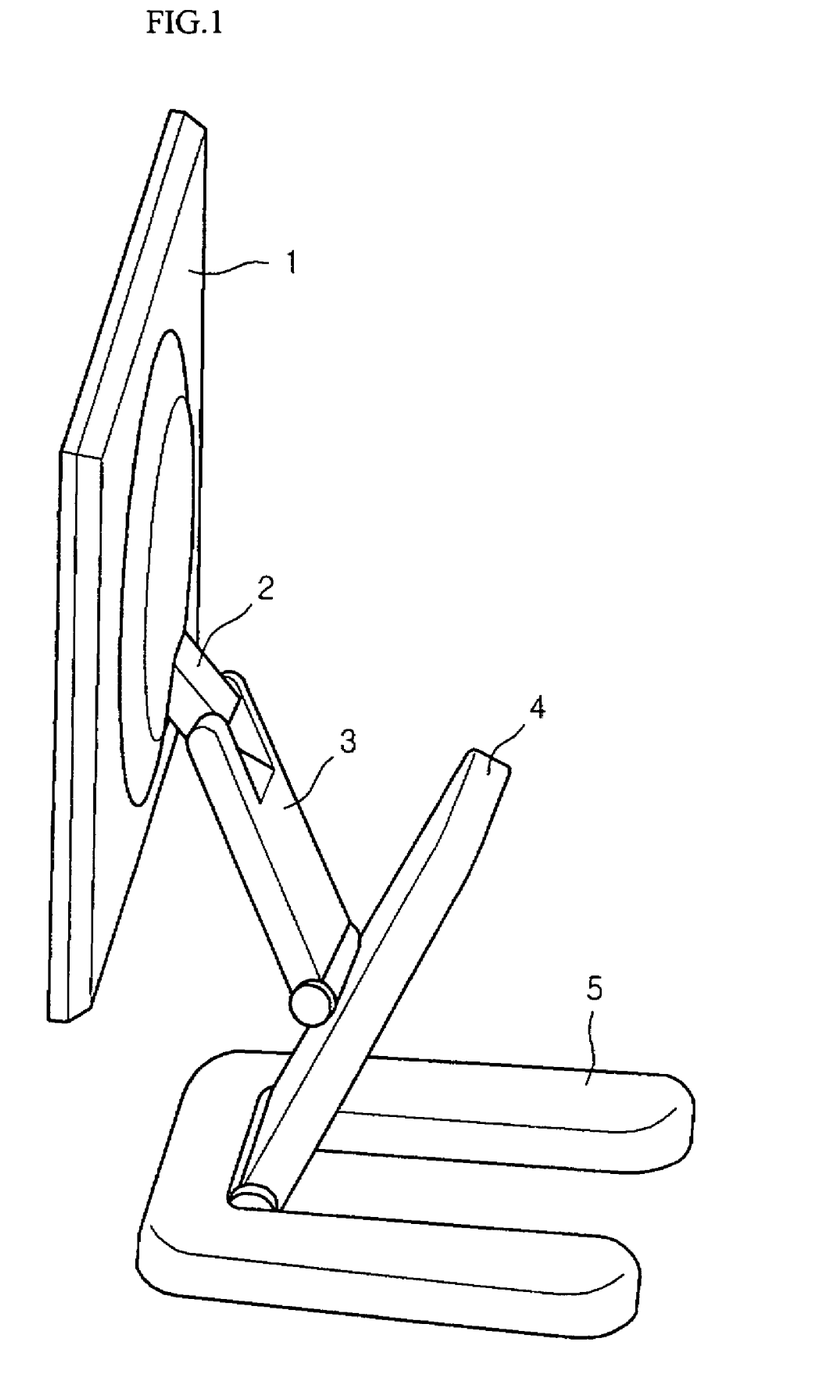
FIG. 1 is a perspective view of a stand of a display device according to the present invention.

FIG. 1 is a perspective view of a stand of a display device according to the present invention.

Referring to FIG. 1, the stand according to the present invention includes a display device 1 on which an image is displayed, a rear fixing part 2 coupled to a rear side of the display device 1, a sliding part 3 extending from the rear fixing part 2 in a rough downward direction, a support part 4 supporting a lower end of the sliding part 3 and guiding a downward movement of the sliding part 3, and a base 5 connected to a lower end of the support part 4 and supporting the display device with respect to a bottom surface.

Also, the rear fixing part 2 and the sliding part 3, the sliding part 3 and the support part 4, and the support part 4 and the base 5 are hingedly connected, so that the aforementioned members can rotate on their connection spots. Such a hinge connection may advantageously allow a user to smoothly move the display device to a desired position.

Also, because a quadric link structure, namely quadric crank mechanism, is provided in the sliding part 3, an angle at which the display device 1 is inclined can be maintained during an operation of rotating the sliding part 3. Accordingly, a user can conveniently control a height of the display device 1, maintaining an initial inclination angle of the display device 1.

In addition, the base 5 has a "." shape opened toward a rear side on the basis of the display device 1, and the support part 4 is completely inserted in the opened portion when being folded. Thus, when the folding of the display device 1 is completed, the support part 4 and the base 5 are disposed as if they are one body having a uniform thickness. Accordingly, a package of the display device has a remarkably small volume, and a product is improved from the esthetic point of view.

Also, a lower end of the sliding part 3 is configured to be supported on the support part 4 and also slide along the extension direction of the support part 4. Therefore, when controlling a height of the display device, a user can conveniently adjust the height of the display device by moving the sliding part 3 up and down along the support part 4.

Individual operations for the position adjustment of the display device will be described later in more detail with reference to FIGS. 9 through 13.

The detailed structure of the present invention will now be described in more detail.

Figure 2:
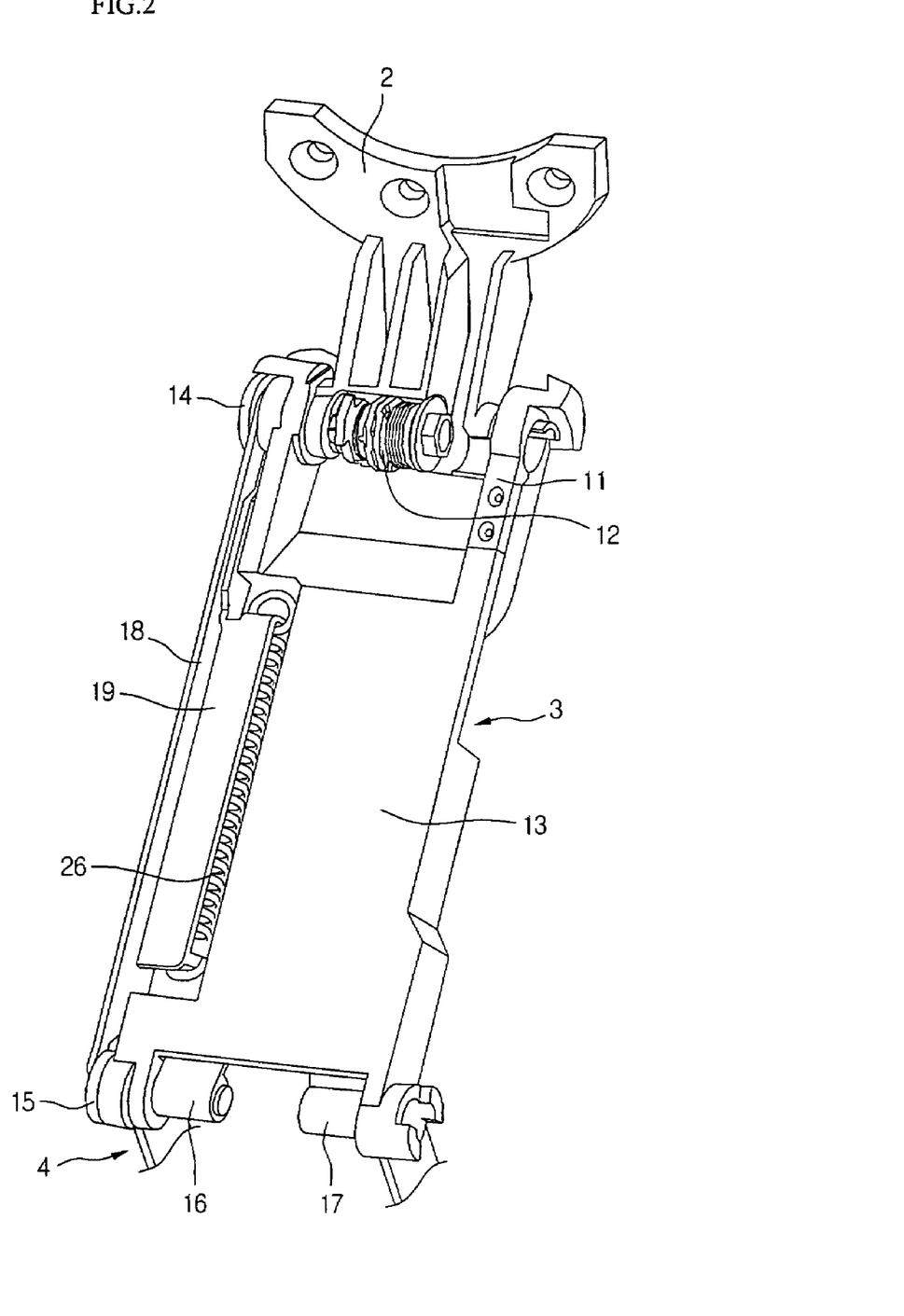
FIG. 2 is a perspective view of a sliding part according to an aspect of the present invention.
Figure 3:
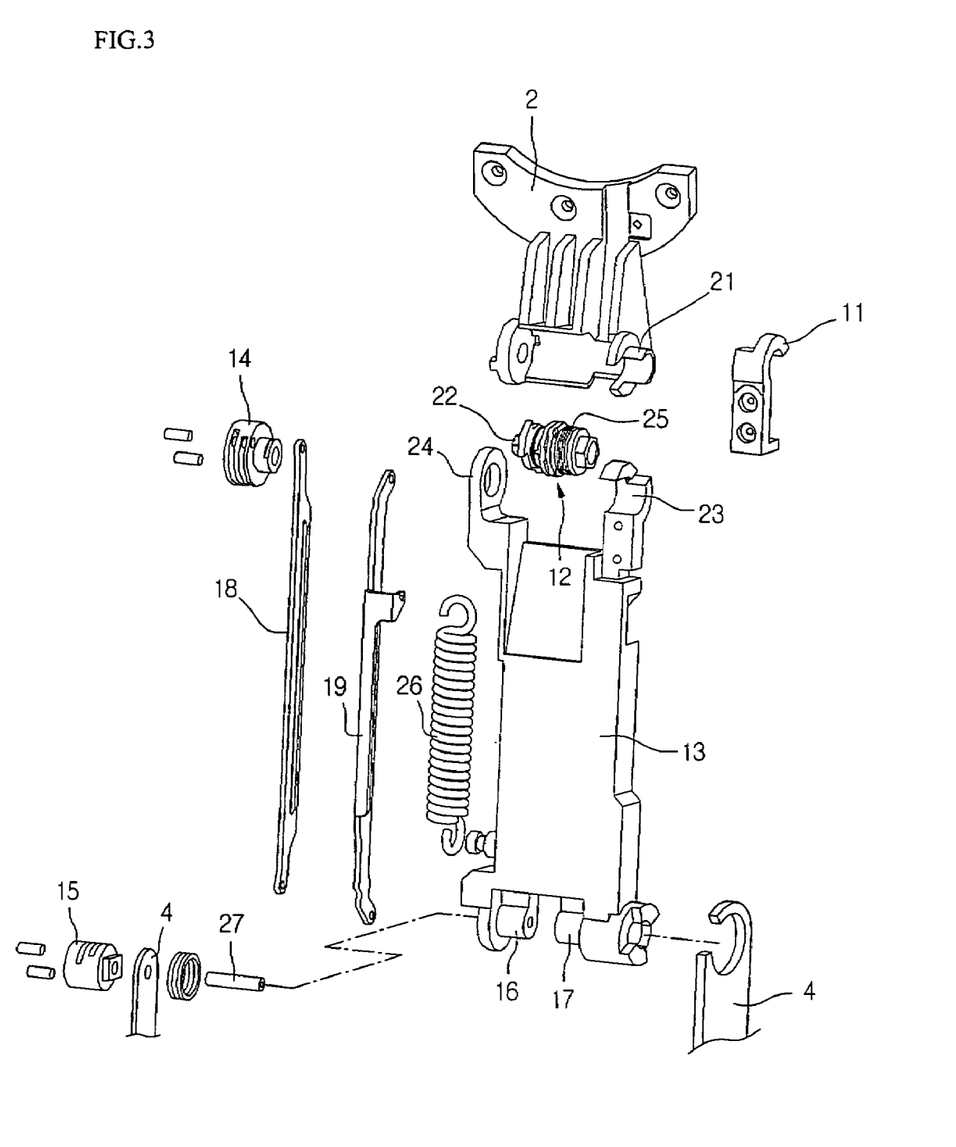
FIG. 3 is an exploded perspective view of a sliding part according to an aspect of the present invention.

FIG. 2 is a perspective view of the sliding part according to the present invention, and FIG. 3 is an exploded perspective view of the sliding part according to the present invention.

Referring to FIGS. 2 and 3, the sliding part 3 includes a first connection part connecting an upper end of the sliding part 3 with the rear fixing part 2, a second connection part connecting a lower end of the sliding part 3 with the support part 4, and a link part connecting the first connection part with the second connection part.

In detail, the link part includes a main link 13 connecting the first connection part and the second connection and providing more than a certain level of connection strength, and auxiliary links 18 and 19 provided to one side of the main link 13 and providing a quadric link function. Lower edge of the auxiliary links 18 and 19 are connected to a link hinge 14 to be eccentric with respect to the rotary axis of the link hinge 14, and upper ends of the auxiliary links 18 and 19 are connected to a support hinge 15 to be eccentric with respect to the rotary axis of the support hinge 15. Consequently, the auxiliary links 18 and 19, a link hinge 14, and the support hinge 15 can be operated as a quadric link.

The quadric link is constructed in a parallelogram structure characterized in that when any one side moves while its opposite side is fixed, the moving side moves parallel to the fixed side. By such a characteristic, an angle at which the display device 1 can be maintained even though the sliding part 3 is rotated.

In detail, the first connection part includes a first hinge shaft 21 formed at a lower side of the rear fixing part 2, and a hinge spring member 12 provided with a second hinge shaft 22. The first connection part rotates in two different manners by the first hinge shaft 21 and the hinge spring member 25.

The structure of the first connection part will now be described in more detail. First, the first hinge shaft 21 is guided by a first hinge receiving part 23 formed at an upper end of the main link 13, and is covered with and supported by a hinge coupling part 11. Therefore, the first hinge shaft 21 can be rotated in a state of having been guided into the first hinge receiving part 23.

Also, the hinge spring member 25 is placed inside the first hinge shaft 21, and in such a state, the second hinge shaft 22 is coupled to the link hinge 14 through a second hinge receiving part 24. The hinge spring member 12 has therein two members that can rotate relative to each other, and the members are connected by the hinge spring 25. One of those two members is fixed to the second hinge shaft 22 and thus rotates together with the link hinge 14, and the remaining one member is fixed to the first hinge shaft 21 and thus rotates with the rear fixing part 2. Of course, a member such as a washer providing a frictional force may further formed in the hinge spring member 12. Also, preferably, the frictional force provided by, e.g., a washer between the two members within the hinge spring member 12 is greater than that between the first hinge shaft 21 and the first hinge receiving part 23.

The operation of the first connection part will now be described.

First, when a user moves the display device 1 to adjust the height of the display device 1, the link hinge 14 of the quadric link revolves around the support hinge 15. Specifically, due to the interaction of the quadric link, the link hinge 14 does not revolve on its own axis but orbits the support hinge 15. Therefore, the second hinge shaft 22 that is fixedly connected to the link hinge 14 only orbits.

In such a state, the frictional force provided by, e.g., the washer between the two members within the hinge spring member 12 is greater than that provided between the first hinge shaft 21 and the first hinge receiving part 23. For this reason, the two members within the hinge spring member 12 do not rotate relative to each other, and the hinge spring member 12 rotates together with the first hinge shaft 21. Instead, the first hinge shaft 21 rotates relative to the hinge receiving part 23. Finally, the main link 13 and the rear fixing part 2 rotate in different directions, the display device 1 fixed to the rear fixing part 2 rotates relative to the main link 13.

Such movements finally result in an aspect that an angle at which the display device 1 is inclined is maintained even when the sliding part 3 rotates about the lower end. Therefore, the user can view the display device at the same angle all the time.

However, to control only the inclination angle of the display device 1, the user applies a considerable amount of force to the display device 1 to induce the two members within the hinge spring member 12 to rotate relative to each other.

The construction and operation of the second connection part will now be described.

The second connection part is a member formed between the sliding part 3 and the support part 4, and includes a first support shaft 27, a support hinge 15 and a first friction portion 16. Herein, the first support shaft 27 is inserted sequentially into the support hinge 15, the support part 4, a lower end of the main link 13, and the first friction portion 16. The first friction portion 16 is fixed with respect to the first support shaft 27. At least one side of the first friction portion 16 contacts with a lower side of the main link 13 to provide a force pushing up the main link 13 when the main link 13 rotates downward. Also, a second friction portion 17 works in the same manner. Here, the first friction portion 16 and the second friction portion 17 are rolled in different directions with respect to the first support shaft 27, so as to provide a sufficient restoration force in any directions when the display device 1 moves upward or downward.

Also, the first support shaft 27 is inserted in the support hinge 15 to be unrotatable. To this end, a portion of the first support shaft 27 inserted in the support hinge 15 may be formed as a non-spherical shape. Also, the first support shaft 27 is fixed with respect to the first friction portion 16.

A contact portion between the support part 4 and the first support shaft 27 is supported by a predetermined first frictional force, and a contact portion between the lower end of the main link 13 and the first support shaft 27 is supported by a predetermined second frictional force. Here, the first frictional force is set to be greater than the second frictional force. Therefore, in general, when the main link 13 rotates by receiving an external force applied to the display device 1, the first support shaft 27 and the lower end of the main link 13 rotate relative to each other at their contact portion, so that the height of the display device is adjusted with its inclination angle maintained. In contrast, when a user wants to change the height, i.e., the extent of inclination, of the main link 13 to thus change the inclination angle of the display device 1, the user may apply a considerable amount of power to let the support part 4 and the first support shaft 27 rotate relative to each other, thereby changing an angle at which the support portion 4 and the support hinge 15 are twisted with respect to each other.

An elastic member 26 is connected between the second auxiliary link 19 and the main link 13 and provides a force rotating the main link 13 in a certain direction when a user rotates the main link 13. In more detail, because the auxiliary link 19 is eccentrically connected with the main link 13, the elastic member 26 is extended in rotating the main link and thus, generates an elastic force. The elastic force works to return the relative positions of the main link 13 and the auxiliary link 19 to original positions. For example, the restoration force of the elastic member 26 may be applied in a direction erecting the main link 13, thereby supporting the weight of the display device 1.

The relation between the support part and the sliding part will now be described in detail.

Figure 4:
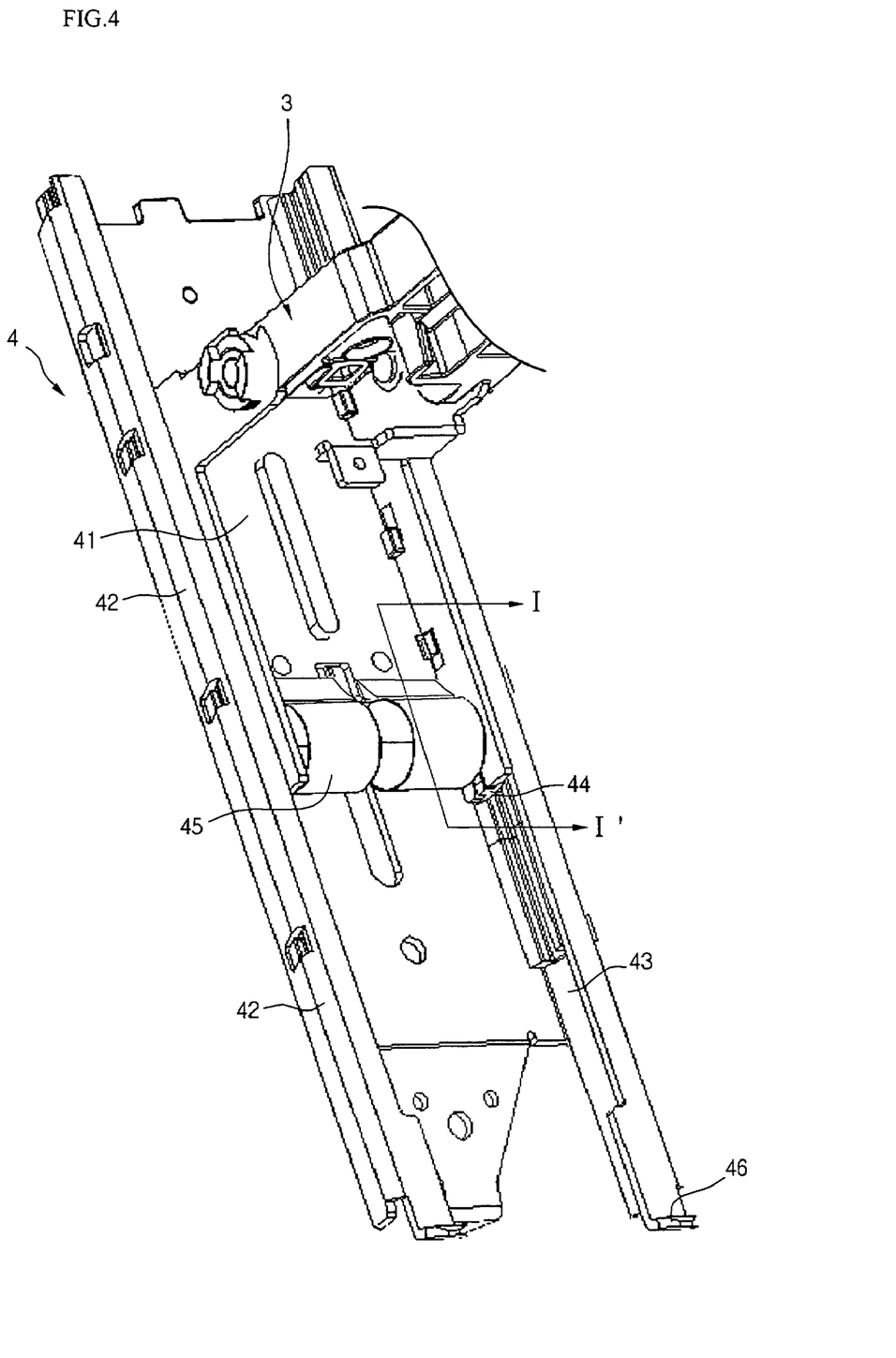
FIG. 4 is a front perspective view of a support part according to an aspect of the present invention.
Figure 5:
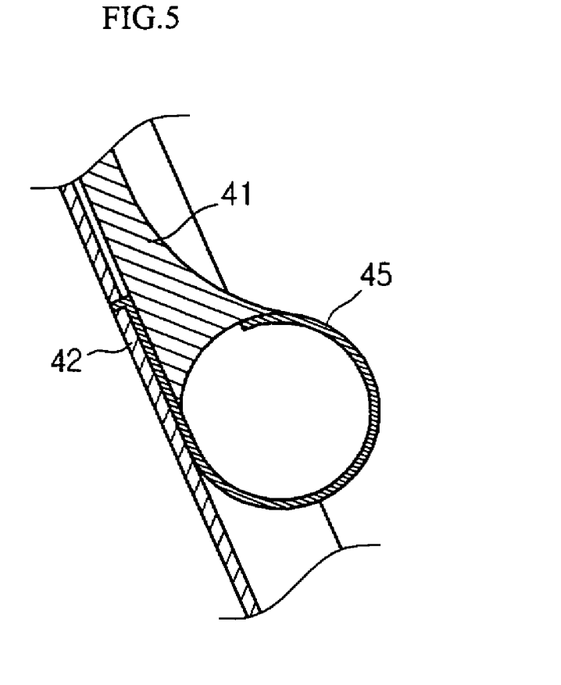
FIG. 5 is a cross-sectional view taken along line I-I' of FIG. 4.

FIG. 4 is a front perspective view of the support part, and FIG. 5 is a cross-sectional view taken along line I-I' of FIG. 4.

Referring to FIGS. 4 and 5, the support part 4 includes a guide panel 42 forming a frame of the support part 4, a sliding panel 41 moving along a direction that the guide panel 42 extends, and a leaf spring 45 fixed to the guide panel 42 and supporting a movement of the sliding panel 41.

Also, a guide protrusion 44 is formed at one side of the sliding panel 41, and an extension groove 43 is formed at a position of the guide panel 42 corresponding to the guide protrusion 44. Also, a stopping protrusion 46 is formed at an end of the guide panel 42.

The operation of the support part 4 by the aforementioned structure will now be described. First, a user applies a force in a direction to descend the sliding part 3, the sliding panel 41 pushes and unfolds the leaf spring 45. Here, the leaf spring generates a drag force preventing the descent of the sliding panel 41, thereby supporting the weight of the display device 1 or conveniently moving up the display device 1. Due to a frictional force generated from the leaf spring 45, the display device 1 is stably supported when the sliding panel reaches a certain height.

To achieve such operations of the leaf spring 45, one end of the leaf spring 45 is fixed to the guide panel 42, and the other end thereof is curved at a certain curvature and contacts with the sliding panel 41.

Because the guide protrusion 44 can move only within the extension groove 43, the guide panel 42 guides an up-and-down movement of the sliding panel 41. Of course, predetermined stopping projections may be provided at upper and lower ends of the guide panel 42 in order to prevent the sliding panel 41 from accidentally slipping out of the guide panel 42.

The connection relation between the support part 4 and the base 5 and the operation thereof will now be described in detail.

Figure 6:
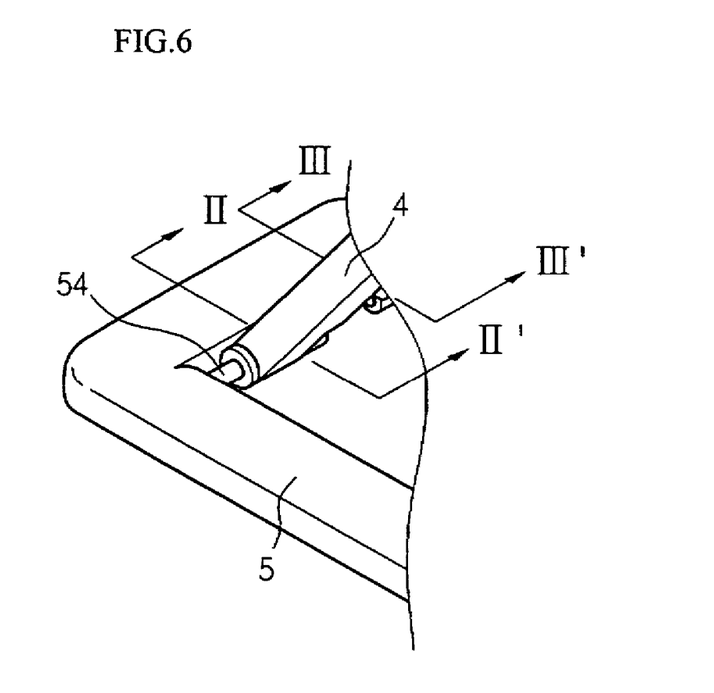
FIG. 6 is an enlarged perspective view of a connection part between the support part and a base.
Figure 7:
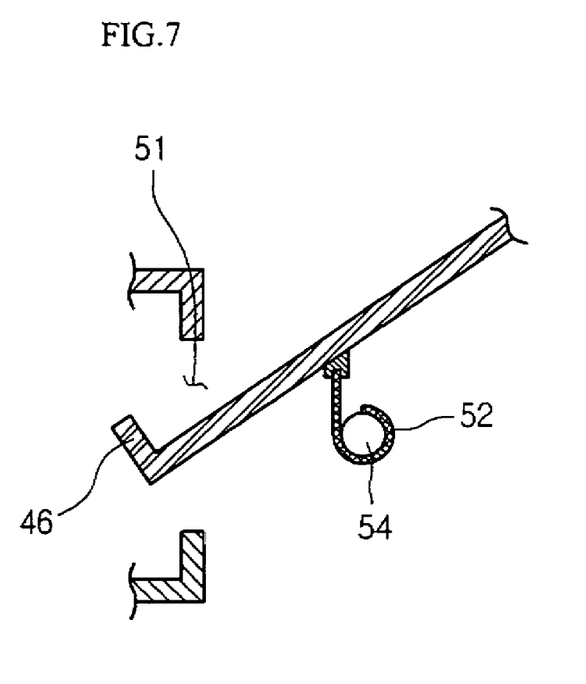
FIG. 7 is a cross-sectional view taken along line II-II' of FIG. 6.
Figure 8:
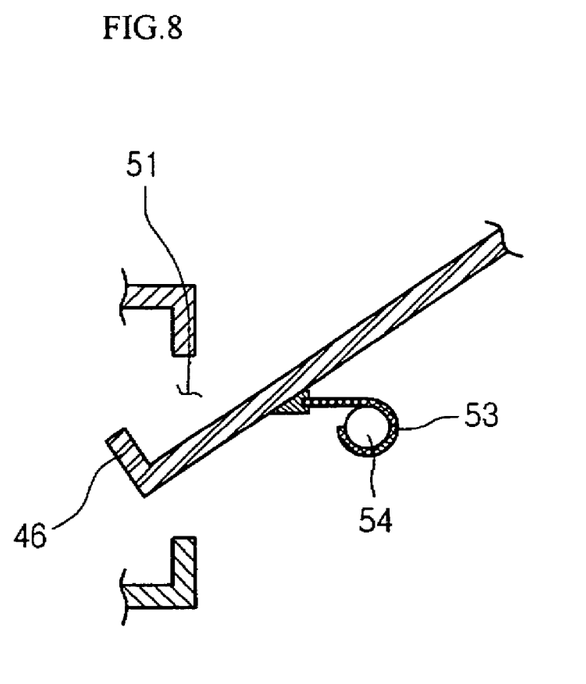
FIG. 8 is a cross-sectional view taken along line III-III' of FIG. 6.

FIG. 6 is an enlarged perspective view of a connection part between the support part and the base, FIG. 7 is a cross-sectional view taken along line II-II' of FIG. 6, and FIG. 8 is a cross-sectional view taken along line III-III'.

First, referring to FIG. 6, the base 5 is formed as a "." shape opened toward a rear side as shown FIG. 1, so that when folded, the support part 4 is inserted in the opened portion of the base 5. Therefore, when completely laid, the support part 4 is completely fit in the base 5. Accordingly, an increase in package volume is prevented from occurring due to the thickness of the support part 4, and a package volume of a stand of the display device can be reduced.

Also, the stopping protrusion 46 is guided within a guide groove 51 provided at a rear side of the base 5, so that when the support part 4 rotates to a certain angle, the stopping protrusion 46 is caught and supported by an end of the guiding groove 51. Accordingly, when completely inserted in the base 5, the support part 4 no more rotates but stably placed inside the base 5. Also, the support part 4 is drawn out from the base 5 in the same manner.

Referring to FIGS. 7 and 8, a frictional force generated with respect to the base 5 when the support part 4 rotates, will now be described in detail.

The third connection part provided between the support part 4 and the base 5 includes a second support shaft 54 fixed with respect to the base 5, and a third friction portion 52 and a fourth friction portion 53 formed as a shape surrounding the second support shaft 54 and generating a frictional force with the second support shaft 54. Here, the third friction portion 52 and the fourth friction portion 53 are coupled to the support part 4, and the second support shaft 54 is fixed to the base 5 to be unrotatable.

Therefore, when the support part 4 rotates, the third and fourth friction portions 52 and 53 rotate together. When the third friction portion 52 and the fourth friction portion 53 rotate, a frictional force is generated between the friction portions 52 and 53 and the second support shaft 54 fixed to the base 5. Due to the frictional force, the support part 4 can be fixed without being moved after a user adjusts an angle at which the support part 4 stands.

Here, because the third and fourth friction portions 52 and 53 surround the second support shaft 54 in the opposite directions, a sufficient friction force can be provided, regardless of the uprightness of the support part 4, the standing direction thereof, the rotation direction thereof.

The structure of the stand of the display device according to the present invention has been sufficiently described. Hereinafter, the operation of a stand implemented by the present invention will be described in more detail.

Figure 9:
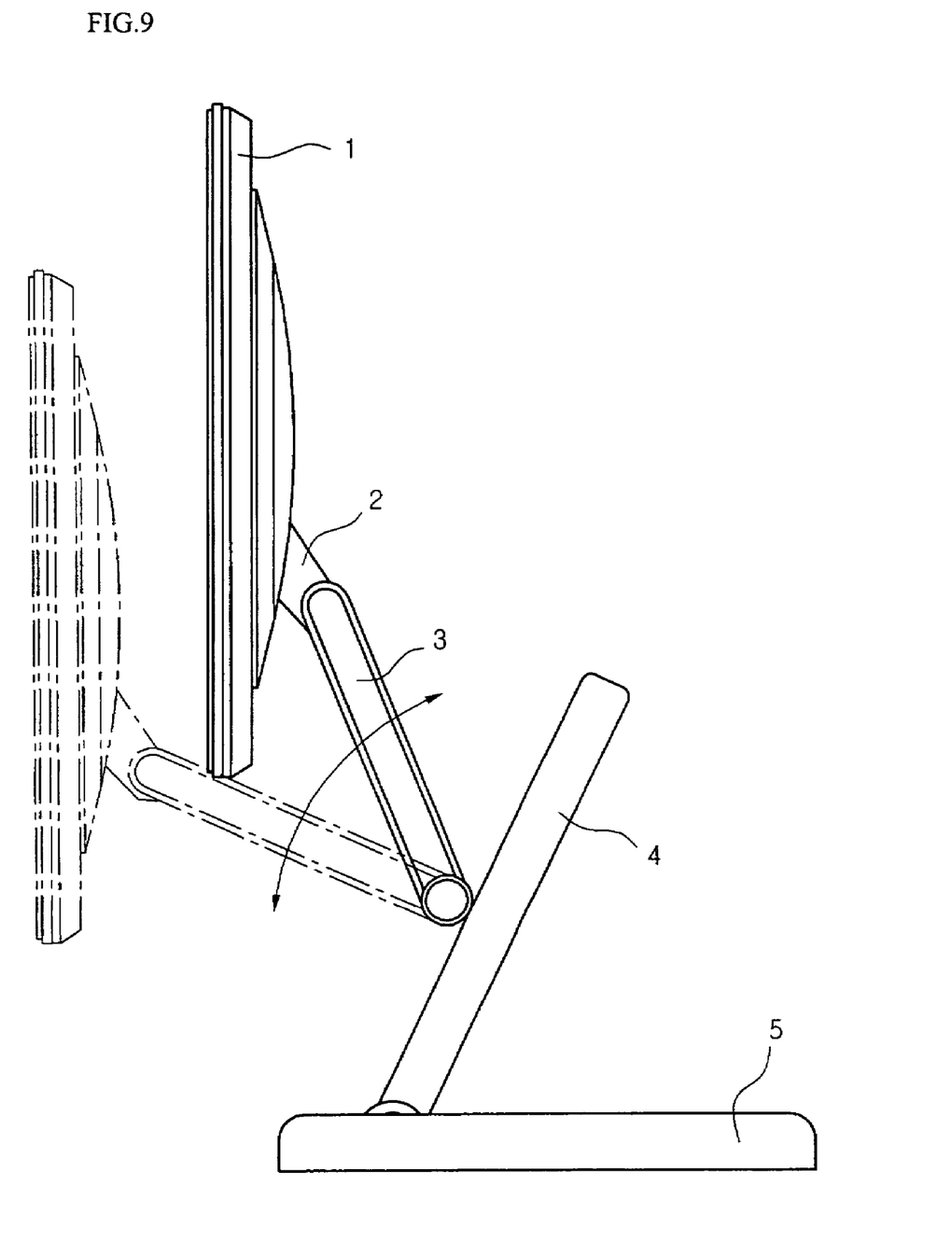
FIG. 9 is a view illustrating a mode in which the display device moves up and down with its inclination angle fixed.

FIGS. 9 through 13 are views illustrating an operation mode of the stand. First, FIG. 9 illustrates that a display device moves up and down with its inclination angle maintained.

Referring to FIG. 9, when a user adjusts the display device 1 with some extent small force, the sliding part 3 rotates around the second connection part connecting the sliding part 3 with the support part 4. Here, the display device 1 can move, maintaining its inclination angle by the quadric link provided inside the sliding part 3.

Such an operation mode can be used when a user intends to move the display device back and force, maintaining a current viewing angle.

Figure 10:
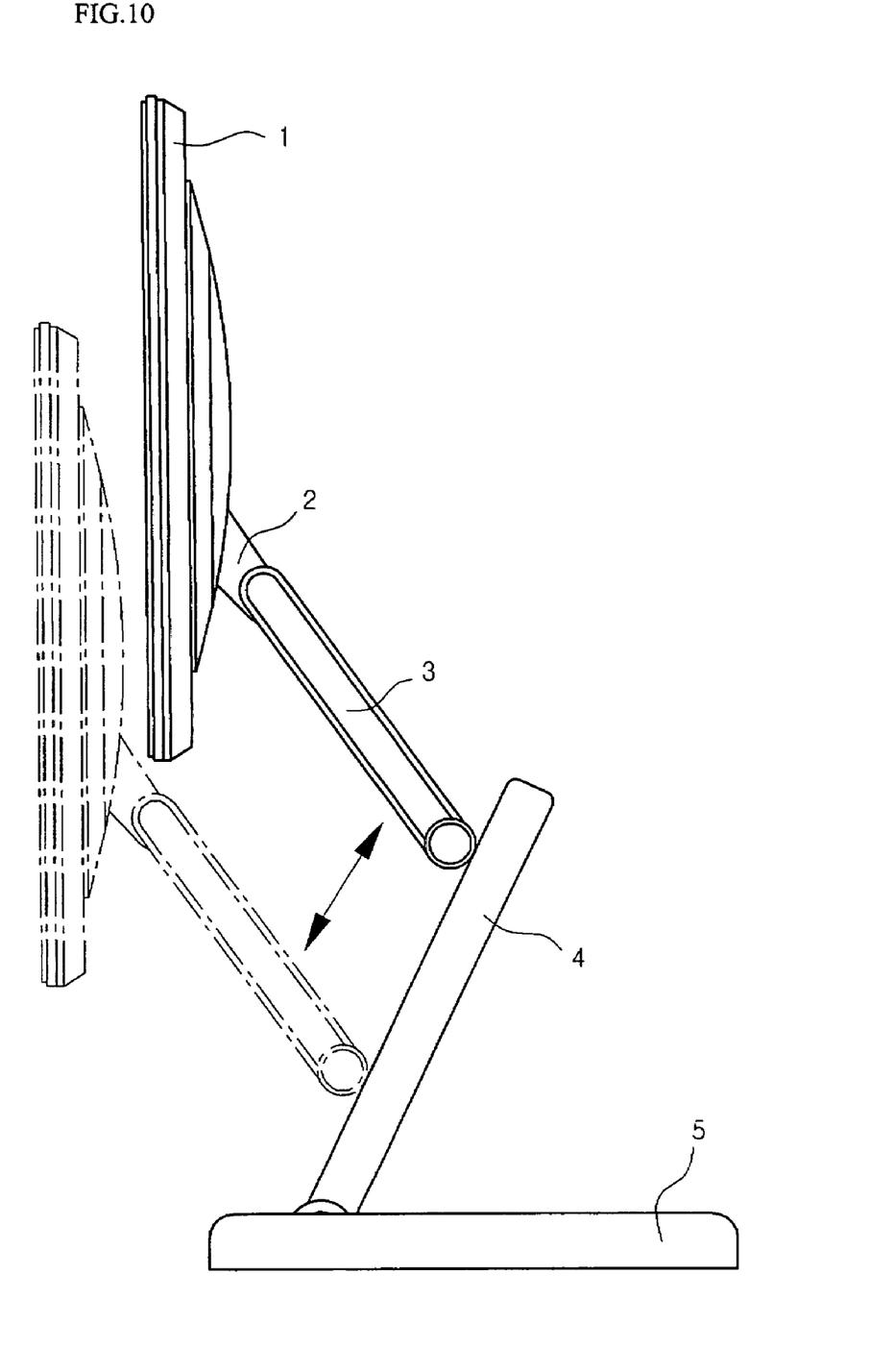
FIG. 10 is a view illustrating an operation mode in which the sliding part moves up and down along the support part.

FIG. 10 is a view illustrating an operation mode in which the sliding part moves up and down along the support part. Referring to FIG. 10, the leaf spring 45 may support the weight of the display device 1, and the user may adjust the height of the display device 1 by descending or ascending the display device 1 along the direction that the support part 4 extends.

In such an operation mode, the display device 1 and the sliding part 3 are lifted up together along the support part 4 and the display device 1 can be adjusted to be higher.

Figure 11:
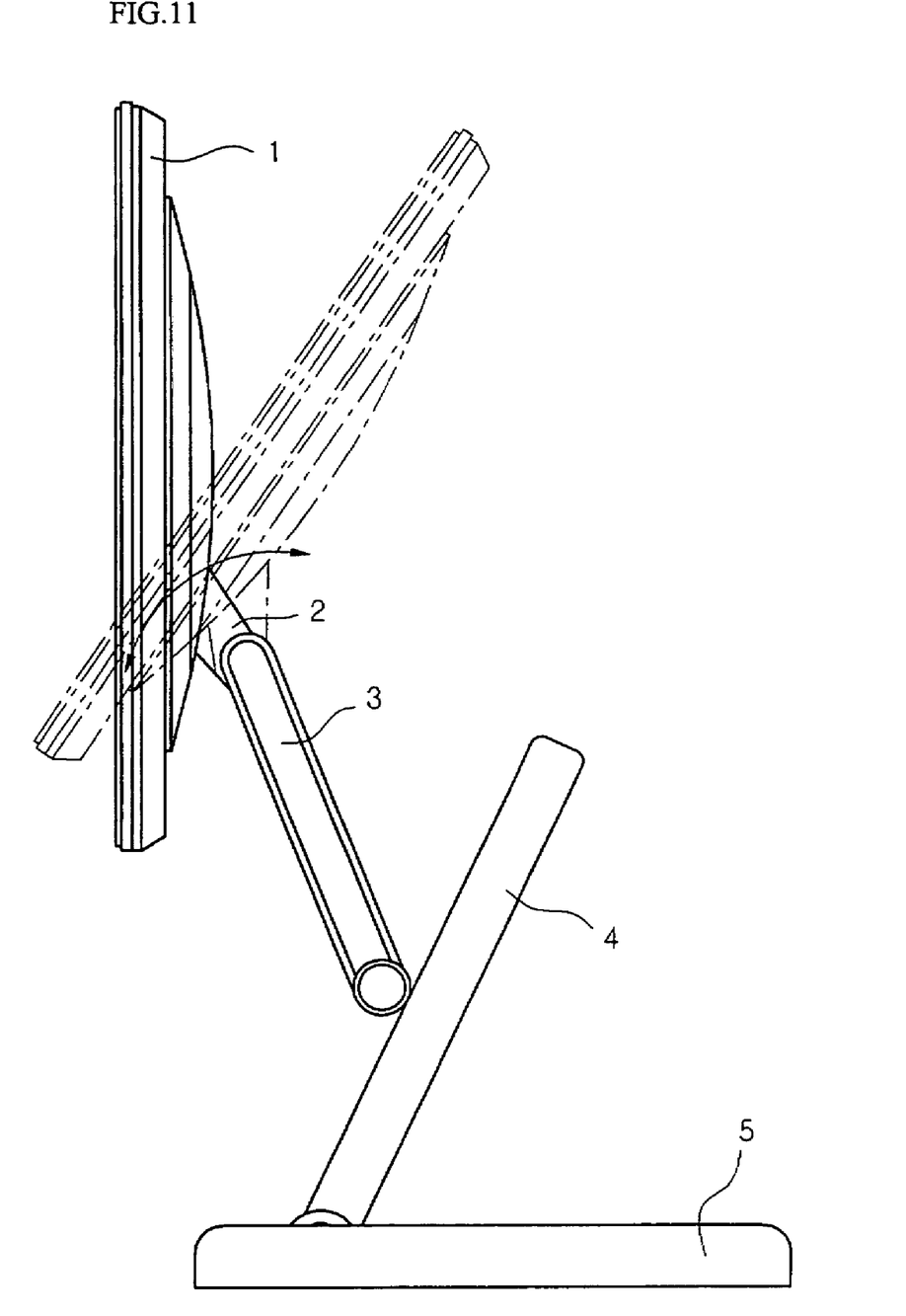
FIG. 11 is a view illustrating an operation mode in which the display device rotates by itself.

FIG. 11 is a view illustrating an operation mode in which the display device rotates by itself. Referring to FIG. 11, because two members provided inside the hinge spring member 12 rotate respectively, the user can adjust a viewing angle with respect to the display device in a vertical direction.

In such an operation mode, the viewing angle with respect to the display device 1 can be adjusted more clearly, the user can manipulate a viewing angle of the display device in a direction that an image becomes clear.

Figure 12:
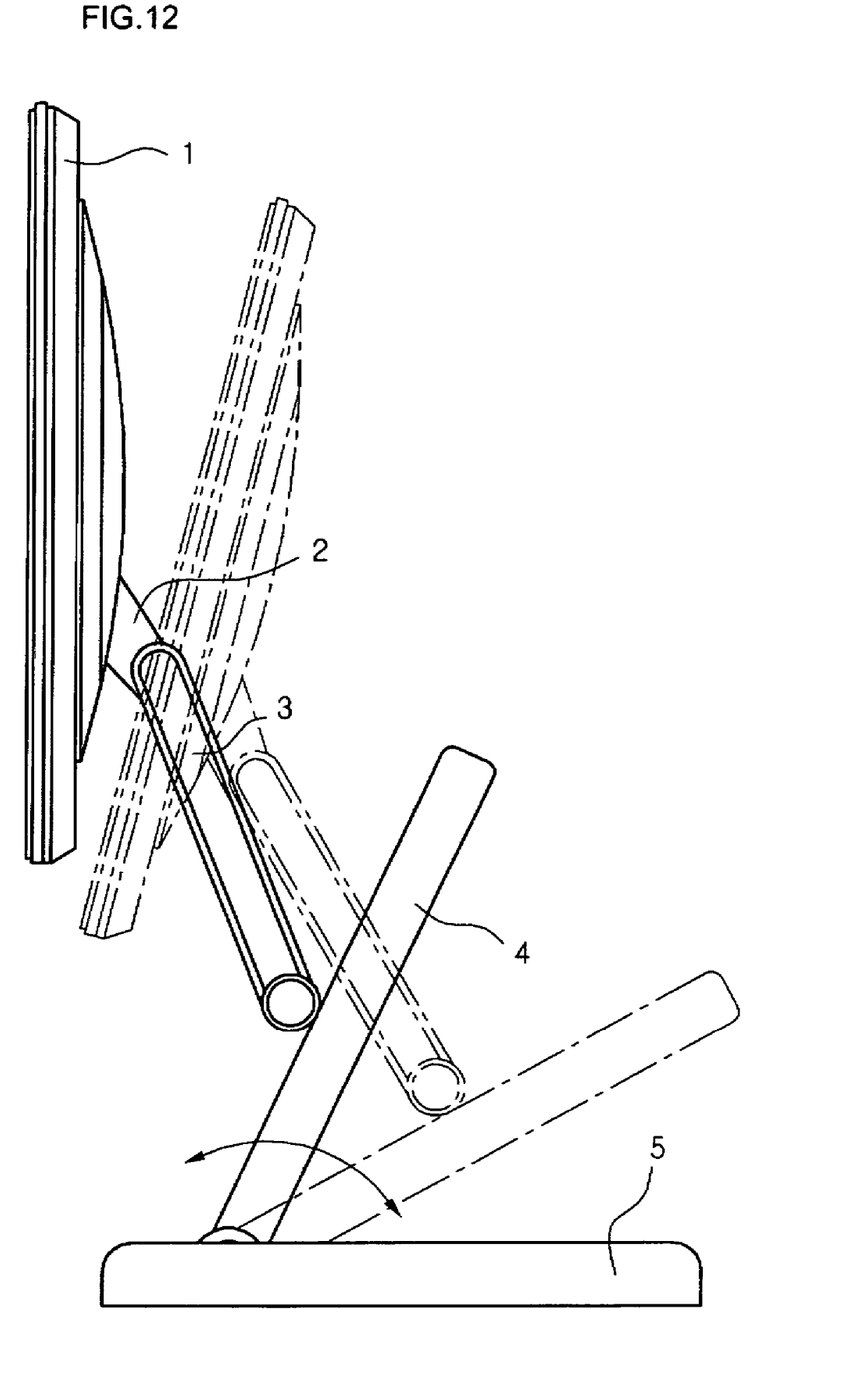
FIG. 12 is a view illustrating an operation mode in which the support part rotates upward and downward about a lower end of the support part.

FIG. 12 is a view illustrating an operation mode in which the support part rotates up and down around a lower end of the support part. Referring to FIG. 12, the support part 4 may be upright or be laid, having the third connection part as a support point.

In such an operation mode, the height of the display device 1 can be adjusted to a greater extent. For example, when the support part 4 is erected completely, the display device 1 may be placed on a higher level.

Figure 13:
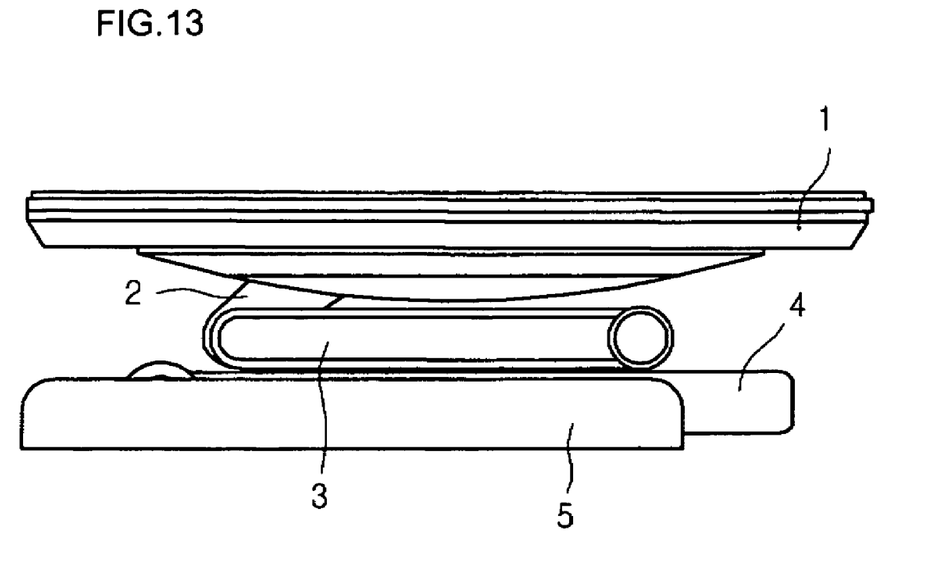
FIG. 13 is a view illustrating a mode in which the display device, the sliding part and the support part are completely folded.

FIG. 13 is a view illustrating a mode in which the display device, the sliding part and the support part are completely folded. Referring to FIG. 13, the support part 4 is completely folded into the base 5, the sliding part 3 is moved to the uppermost side of the support part 4 and is folded parallel to the support part 4 thereover, and the display device 1 is completely folded over the sliding part 3.

Such an operation mode is used to move the stand of the display device or package up the stand of the display device, and in this mode, the package volume is in a minimized state.

Of course, more than one of the operation modes illustrated in FIGS. 9 through 13 can be performed at the same time.

Various modifications and variations in embodiment can be made within the scope of the present invention. For example, when the support part is fixed to the base, it is apparent that the height of the display device can be adjusted to a greater extent even though inconvenience may exist at the time of packaging.

Also, when the quadric link structure is not employed, the display device may be packaged conveniently to a small volume and the position thereof may be manipulated in various manners even though the inclination angle of the display device may not be easily adjusted.

As so far described, according to the present invention, the height and inclination angle of the display device may be adjusted in various manners, and such facilitation in position control of the display device may contribute to improving the user's convenience.

Also, a package of the display device may have a small volume, which reduces a distribution cost and facilitates movement.

Also, various operation modes can be implemented despite the simplicity of the display device structure, and therefore, the device can be manufactured at a low cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device, comprising:
   a rear fixing part fixed to a rear side of a display device;
   a sliding part rotatably coupled to the rear fixing part for rotation about a first rotation axis parallel to a bottom surface;
   a support part slidably supporting a lower portion of the sliding part;
   a support hinge configured to permit the sliding part to rotate around the support part on a second rotation axis parallel to the first rotation axis, wherein the support hinge is movable along with the sliding part; and
   a base rotatably supporting a lower portion of the support part with respect to the bottom surface,
   wherein the support part is rotatably supported about a third rotation axis parallel to the first rotation axis, and the second rotation axis is moveable corresponding to a sliding motion of the sliding part.

2. The stand according to claim 1, wherein the base includes an opened portion at a rear side thereof, the opened portion allowing the insertion of the support part, and wherein the support part is inserted in the opened portion, and a surface of the support part is contacted to the bottom surface when the support part is folded.

3. The stand according to claim 1, wherein the lower portion of the sliding part is supported on the support part by a frictional force.

4. The stand according to claim 1, wherein the lower portion of the support part is supported on the base by a frictional force.

5. The stand according to claim 1, wherein the support part comprises:
   a sliding panel to which a lower portion of the sliding part is fixed; and
   a guide panel guiding a sliding motion of the sliding panel along a direction that the guide panel extends.

6. The stand according to claim 5, wherein the guide panel includes an extension groove formed along an extension direction thereof, and the sliding panel includes a guide protrusion protruding therefrom and guided by the extension groove.

7. The stand according to claim 5, further comprising a leaf spring having one end fixed to the guide panel and extended and compressed in contact with the sliding panel.

8. The stand according to claim 7, wherein the leaf spring is rolled at a portion coming in contact with the sliding panel.

9. The stand according to claim 1, wherein the support part includes a stopping protrusion provided at an end thereof, and the base includes a guide groove stopping the stopping protrusion to set a limit on the extent to which the support part is folded.

10. The stand according to claim 1, wherein the sliding part comprises:
   a main link; and
   a pair of auxiliary links provided at one side of the main link and operated as a quadric link.

11. The stand according to claim 1, wherein the support part extends upward from the base.

12. A stand for a display device, comprising:
   a rear fixing part fixable to a rear side of a display device;
   a sliding part extending downward from the rear fixing part;
   a support part slidably supporting a lower portion of the sliding part with an extension direction of the support part;
   a support hinge configured to permit the sliding part to rotate around the support part, wherein the support hinge is movable along with the sliding part;
   a quadric link provided between the rear fixing part and the support part and adjusting an angle when the sliding part rotates; and
   a base rotatably supporting a lower end portion of the support part,
   wherein the quadric line comprises:
      a link hinge provided to a first connection part connecting the sliding part with the rear fixing part, and providing a first rotation axis for a rotation of the rear fixing part;
      a support hinge provided to a second connection part connecting the sliding part with the support part, and providing a second rotation axis for a rotation of the sliding part with respect to the support part; and
   a pair of auxiliary links eccentrically connecting the link hinge and the support part, and
   the bases comprises a support shaft fixed to the base, and providing a third rotation axis for a rotation of the support part to the base.

13. The stand according to claim 12, wherein the quadric link constantly maintains an inclination angle of the rear fixing part when the sliding part rotates.

14. The stand according to claim 12, wherein the sliding part has a lower portion moving along a direction that the support part extends.

15. A stand for a display device, comprising:
   a rear fixing part fixable to a rear side of a display device;
   a sliding part rotatably supporting the rear fixing part and extending slantingly downward therefrom;
   a support part slidably and rotatably supporting a lower portion of the sliding part, the support part extending toward an anti-parallel direction with the sliding part;
   a support hinge configured to permit the sliding part to rotate around the support part, wherein the support hinge is movable along with the sliding part corresponding to the support part; and
   a base supporting a lower portion of the support part, wherein the rear fixing part is rotatably connected to the sliding part with a first rotation axis, and the sliding part is rotatably supported by the support part with a second rotation axis, and the support part is rotatably supported by the base with a third rotation axis, and the second rotation axis is movable along an extension direction of the support part.

16. The stand according to claim 12, wherein the support part includes a stopping protrusion provided at an end thereof, and the base includes a guide groove stopping the stopping protrusion to set a limit on the extent to which the support part is folded.

17. A stand for a display device, comprising:
   a rear fixing part fixable to a rear side of a display device;
   a sliding part extending downward from the rear fixing part;
   a support part supporting a lower portion of the sliding part; and
   a base supporting a lower portion of the support part,
   wherein the sliding part is movable along a direction that the support part extends,
   wherein the sliding part is rotatably connected to the support part,
   wherein one end of the sliding part slides on the support part inside of a projection of the support part, and wherein the support part includes a stopping protrusion provided at an end thereof, and the base includes a guide groove stopping the stopping protrusion to set a limit on the extent to which the support part is folded.

* * * * *